Patented Aug. 11, 1931

1,818,897

UNITED STATES PATENT OFFICE

HACHIRO KUMAGAWA, OF HONGOKU, TOKYO, AND KAMAKICHI SHIMOMURA, OF NISHIOMACHI, HAZUGUN, AICHIKEN, JAPAN

METHOD OF PREPARING AND SEPARATING THE CELLULOSE MATERIAL, SUITABLE FOR PAPER-MANUFACTURING, FROM PLANT RAW MATERIAL WITH PITH FIBER

No Drawing. Application filed May 31, 1927. Serial No. 195,583.

This invention relates to the method of preparing cellulose material, suitable for paper-manufacturing, out of plant raw materials such as cane sugar bagasse, kaoliang or corn straw, in such a way that long and thin fiber, and, short and pithy one, may be caught separately, expelling the water containing remained sugar and other mixed water soluble substances as well as dust in suspension, by the proper device described in the foregoing.

The object of this invention is to utilize those plant raw materials with pith fiber which have been wasted till this time as fuel or food of cattles, and to prepare the cellulose material suitable for paper-manufacturing out of them economically.

The fact that the raw material such as bagasse, contains pith fibers, is a decided disadvantage in working up the fibers into paper.

It is well known fact that different kinds of cellulose raw materials, when subjected to the same digestion process under the same operating conditions, are attacked by the digestion liquors in a greater or less degree depending on the nature of the fibers.

In other words, there is present in this case the possibility that the pithy fiber of the raw material is attacked much more easily by the chemicals than the rest of the material. Similarly it is known that the digestion of the pithy fibers consumes much more of chemicals but, nevertheless, it yields little chemical pulp. Because of these facts it appears necessary to effect a separation of the pithy fibers from the rest of the raw material. There is another reason why this should be done and that is that the short fibers produced from the pithy substances tend to clog up the pores of the paper machine. Furthermore when this part of raw material is removed, a more uniform chemical pulp is obtained while when the pith is allowed to remain mixed with longer fibers, the chemical pulp and the paper made of it do not possess the strength that they would have, had the short fibers been removed.

As far as the value of the two materials for manufacture into paper is concerned, the longer fiber material is much more suited for this purpose, although it is possible to utilize the short fiber bagasse, when added to the paper in certain definite quantities.

Hitherto, for the purpose of manufacturing paper out of the fiber materials with pith, such as cane sugar bagasse, kaoliang or corn straw, the raw material has been digested in a digester under high pressure with chemicals such as caustic soda etc., without any preliminary treatment except only removing dust from its surface in dry state.

The test made by the inventors indicates that bagasse from pressing machine of sugar factory contains about 55 to 65 per cent long fibers, 25 to 30 per cent short and pithy fibers, about 10 to 15 per cent water soluble substances and 2 to 5 per cent of sugar which has not been taken away for sugar manufacturing, in dry state calculation.

In the known method, the chemical in digester attacks not only the cellulose material but also sugar remained and humous substance is produced by the decomposition of sugar and acts as the big hindrance for chemical to decompose the fiber materials. After this decomposition takes place, those impurities have been tried to be taken away but short fiber is attacked so much that it can not be separated easily.

In addition to this trouble, on account of the useless consumption owing to the reaction with the water soluble substances, the amount of chemical for the digestion must be increased. These are the chief reason why the old method, in spite of many investigations, has failed in the industry of large scale.

In the new method, however, bagasse with pith fiber is beaten in a special beater or hollander under pouring of water, hot or cold, and the water containing sugar and other water soluble substances as well as dust is expelled out of it, sand and other solid impurities precipitate at the bottom, and long and thin fibers only suspend while the short pithy fibers float on the surface of the water. Therefore after necessary time of interval, with suitable device, the short pithy substance which floats and, long and thin one which suspends in water can be caught separately. These two kinds of fiber materials, long and short, are to be prepared for the material for paper-manufacturing, either separately, or mixed in any desired proportion, according to the kind of material desired.

Therefore, by this method, costs of chemicals and heating can be saved in great deal and one can get very good paper in quality, by using the long fiber alone, as the pith substance and sugar which are harmful in working up fibers into paper can easily be removed.

Moreover, one can get another kind of paper economically by taking the mixture of the two kinds of fibers, long and short, in suitable proportion. Accordingly the method can be used for larger industry.

Claim of patent:—

The method of recovering and separating long and thin fiber and short and pithy fiber from fibrous material such as cane sugar bagasse, consisting in beating the raw material to render the fibers thereof readily separable, subjecting such beaten material to the action of a body of water flowing in one direction to cause the sugar and other water soluble content to be removed from the mass, the heavy insoluble material to be precipitated, the long and thin fiber to be suspended in the water body and the short and pithy fiber to float on the surface of such water body, and separately removing the long and thin fiber and the short and pithy fiber from the water body.

In testimony whereof we affix our signatures.

HACHIRO KUMAGAWA.
KAMAKICHI SHIMOMURA.